US011127061B2

(12) United States Patent
Herring et al.

(10) Patent No.: US 11,127,061 B2
(45) Date of Patent: Sep. 21, 2021

(54) METHOD, PRODUCT, AND SYSTEM FOR IDENTIFYING ITEMS FOR TRANSACTIONS

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Ankit Singh, Morrisville, NC (US); Jeffrey John Smith, Raleigh, NC (US); Adrian Xavier Rodriguez, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1005 days.

(21) Appl. No.: 14/883,198

(22) Filed: Oct. 14, 2015

(65) Prior Publication Data
US 2016/0110703 A1 Apr. 21, 2016

Related U.S. Application Data

(60) Provisional application No. 62/064,323, filed on Oct. 15, 2014.

(51) Int. Cl.
*G06Q 30/06* (2012.01)
*G07G 1/00* (2006.01)
(Continued)

(52) U.S. Cl.
CPC ......... *G06Q 30/0623* (2013.01); *G01B 11/00* (2013.01); *G01G 19/4144* (2013.01);
(Continued)

(58) Field of Classification Search
CPC ............. G07G 1/0063; G06K 2209/17; G06K 9/00201; G06Q 20/20; G06Q 20/201; G06Q 30/0623; G06Q 20/208; G06Q 30/0635
See application file for complete search history.

(56) References Cited

U.S. PATENT DOCUMENTS 5,497,314 A 3/1996 Novak
6,592,033 B2 7/2003 Jennings et al.
(Continued)

FOREIGN PATENT DOCUMENTS

WO 2013134865 A1 9/2013

OTHER PUBLICATIONS

Bolle et al., Proc., "VeggieVision: A Produce Recognition System", http://www.cse.unr.edu/~bebis/CS479/PaperPresentations/BolleVeggieVision_WACV96.pdf.
(Continued)

*Primary Examiner* — Florian M Zeender
*Assistant Examiner* — Milena Racic
(74) *Attorney, Agent, or Firm* — Patterson + Sheridan, LLP

(57) ABSTRACT

A method, computer program product, and system to identify one or more items in a transaction are provided. The method includes capturing images of the items, determining a set of possible identifications for each item based on the images, determining information regarding the transaction, selecting an identification for each item from the sets of possible identifications, based on the determined information, and adding the selected identifications to the transaction. Identifications for items may be selected based on confidence factors, price thresholds, and customer information.

17 Claims, 8 Drawing Sheets

(51) Int. Cl.
| | | |
|---|---|---|
| *G06Q 20/20* | (2012.01) | |
| *G06Q 10/08* | (2012.01) | |
| *G06T 7/66* | (2017.01) | |
| *G01B 11/00* | (2006.01) | |
| *G01G 19/414* | (2006.01) | |
| *G01S 19/13* | (2010.01) | |
| *G06F 1/16* | (2006.01) | |
| *G06F 3/01* | (2006.01) | |
| *G06K 9/00* | (2006.01) | |
| *G06K 9/20* | (2006.01) | |
| *G06K 9/46* | (2006.01) | |
| *G06K 9/62* | (2006.01) | |
| *G06Q 20/18* | (2012.01) | |
| *G06Q 30/00* | (2012.01) | |
| *G06Q 30/02* | (2012.01) | |
| *G06T 11/60* | (2006.01) | |
| *H04N 5/225* | (2006.01) | |
| *H04N 5/232* | (2006.01) | |
| *H04N 7/18* | (2006.01) | |
| *G06Q 20/32* | (2012.01) | |
| *G06K 9/78* | (2006.01) | |
| *G01G 19/40* | (2006.01) | |
| *G01B 11/02* | (2006.01) | |

(52) U.S. Cl.
CPC .............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0054* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06K 2009/00328* (2013.01); *G06K 2209/17* (2013.01); *G06T 2207/30232* (2013.01)

(56) References Cited

U.S. PATENT DOCUMENTS

| | | |
|---|---|---|
| 7,229,015 B2 | 6/2007 | Persky |
| 7,646,887 B2 | 1/2010 | Goncalves et al. |
| 7,653,574 B2 | 1/2010 | Harper et al. |
| 7,949,568 B2 | 5/2011 | Fano et al. |
| 8,448,858 B1 | 5/2013 | Kundu et al. |
| 8,474,715 B2 | 7/2013 | Goncalves |
| 8,494,909 B2 | 7/2013 | Goncalves |
| 8,571,298 B2 | 10/2013 | McQueen et al. |
| 8,732,024 B2 | 5/2014 | Jacobs |
| 8,744,176 B2 | 6/2014 | Feris et al. |
| 8,805,014 B2 | 8/2014 | Ross et al. |
| 8,818,875 B2 | 8/2014 | Karnin et al. |
| 9,786,000 B2 | 10/2017 | Herring et al. |
| 2002/0016740 A1 | 2/2002 | Ogasawara |
| 2003/0163399 A1 | 8/2003 | Harper et al. |
| 2005/0189412 A1* | 9/2005 | Hudnut ............... A47F 9/046 235/383 |
| 2008/0294514 A1 | 11/2008 | Calman |
| 2009/0232368 A1 | 9/2009 | Niinuma et al. |
| 2010/0002902 A1* | 1/2010 | Landers, Jr. ......... G06Q 20/202 382/100 |
| 2010/0063862 A1 | 3/2010 | Thompson et al. |
| 2010/0076855 A1 | 3/2010 | Kamin et al. |
| 2010/0086192 A1 | 4/2010 | Grigsby et al. |
| 2012/0054011 A1 | 3/2012 | Petersen et al. |
| 2012/0233003 A1 | 9/2012 | Calman et al. |
| 2012/0239504 A1 | 9/2012 | Curlander et al. |
| 2013/0018741 A1 | 1/2013 | Ostrowski et al. |
| 2013/0030915 A1 | 1/2013 | Statler et al. |
| 2013/0048722 A1 | 2/2013 | Davis et al. |
| 2013/0144759 A1 | 6/2013 | Toyomura et al. |
| 2013/0182899 A1 | 7/2013 | Naito et al. |
| 2013/0223673 A1 | 8/2013 | Davis et al. |
| 2013/0235368 A1 | 9/2013 | Tornwall et al. |
| 2014/0021258 A1 | 1/2014 | Olmstead |
| 2014/0052563 A1* | 2/2014 | Watkins ............ G06Q 30/0621 705/26.5 |
| 2014/0214623 A1 | 7/2014 | Cancro et al. |
| 2014/0279191 A1 | 9/2014 | Agarwal et al. |
| 2014/0304059 A1* | 10/2014 | Wang ................ G06Q 30/0234 705/14.34 |
| 2014/0365334 A1 | 12/2014 | Hurewitz |
| 2015/0012396 A1 | 1/2015 | Puerini et al. |
| 2015/0019391 A1 | 1/2015 | Kumar et al. |
| 2015/0100433 A1 | 4/2015 | Choy et al. |
| 2015/0134413 A1 | 5/2015 | Deshpande et al. |
| 2015/0235110 A1 | 8/2015 | Curtis et al. |
| 2016/0027091 A1* | 1/2016 | McGrath ............ G06Q 30/0633 705/26.8 |

OTHER PUBLICATIONS

Sun et al., "Fruit Recognition (the PRISM project)", http://stat.bell-abs.com/dxsun/fruit/index.html.

\* cited by examiner

METHOD, PRODUCT, AND SYSTEM FOR IDENTIFYING ITEMS FOR TRANSACTIONS

CROSS-REFERENCE TO RELATED APPLICATIONS

This application claims benefit of U.S. Provisional Patent Application Ser. No. 62/064,323, filed Oct. 15, 2014, entitled "Integrated Shopping Environment," which is herein incorporated by reference.

BACKGROUND

The present disclosure relates to techniques for identifying items in a collection, and more specifically, to automated techniques for identifying items selected for purchase.

In some stores, items presented when a customer is checking out are identified by a bar-code reader that reads a bar-code of the item and identifies the item. In many of these stores, a shopper or store associate presents the items serially (i.e., one at a time) to the bar-code reader. Items without bar-codes (e.g., produce which does not have a bar-code) are identified by a person, who inputs the identification into a check-out system (e.g., a cash register).

In some other stores, a scan tunnel system may be used to identify items without requiring a person (e.g., a customer or store associate) to present the items. In current scan tunnel systems for checking out customers, many cameras are utilized to increase the likelihood that items are successfully identified by at least one camera. Many belts may also be used to reorient items during scanning Multiple cameras and belts increase the cost of these tunnel systems. However, items are sometimes not identified by the scan tunnel system, requiring that a person (e.g., a store associate) intervene to identify the item and allow completion of the transaction.

Therefore, there is a need for continuing to improve the customer experience, expedite checkout and minimize intervention from store personnel.

Figure 1:
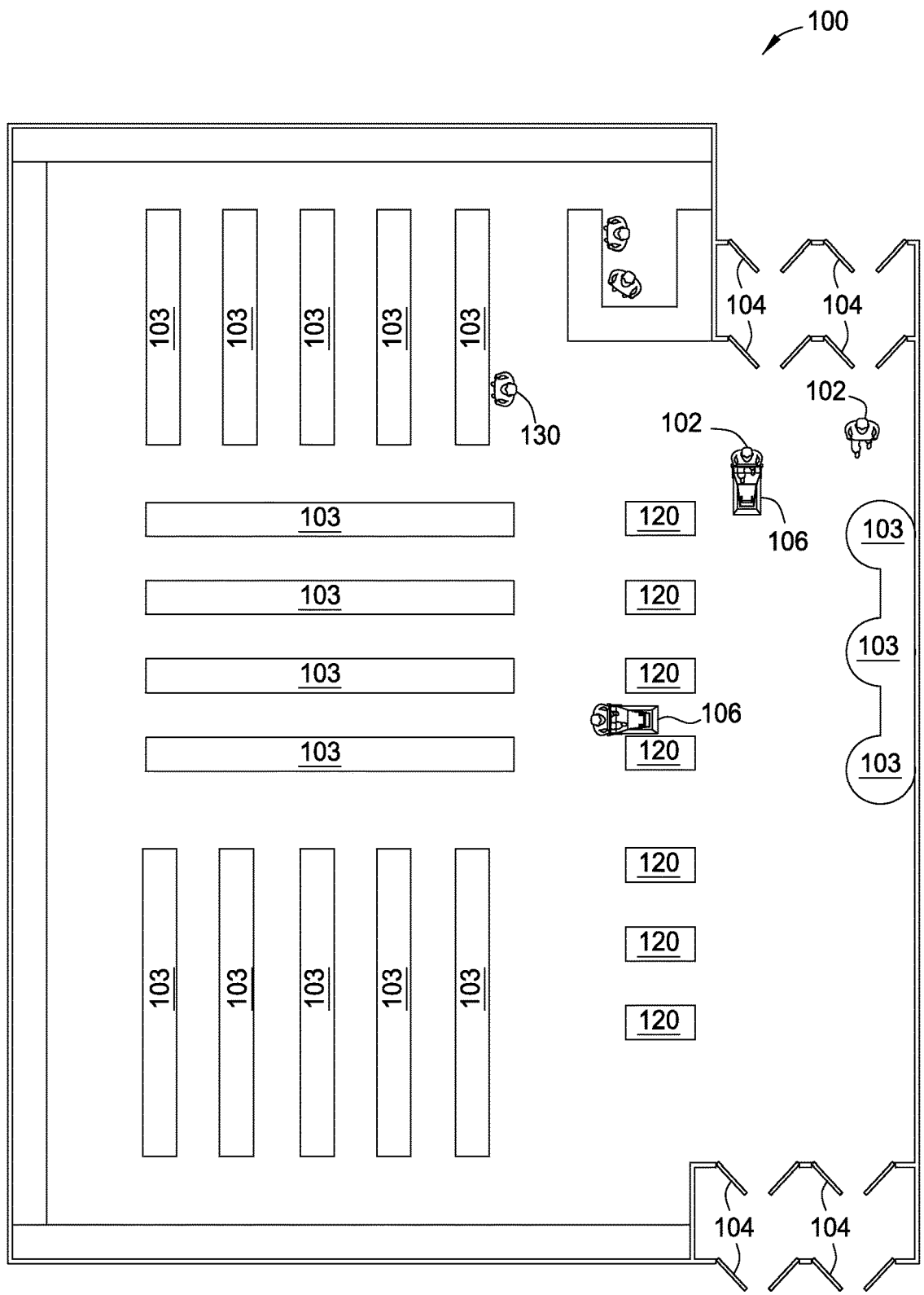
FIG. 1 is a plan view of an exemplary store, according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to identifying one or more items in a transaction. According to aspects of the present disclosure, a retailer may use a point of sale (POS) system with one or more visual sensors to determine information about items selected for purchase and about the purchaser. The POS system may determine several possibilities for an item the purchaser has selected, and then use other information (e.g., information about other items in the transaction, information about the purchaser, etc.) to select one of the possibilities to identify the item. The POS system then adds the selected item to the transaction.

According to aspects of the present disclosure, a POS system may identify all of the items in a collection of items selected for purchase from one or more images of the collection. In some aspects of the present disclosure, the POS system may identify the purchaser from one or more images of the purchaser and charge the purchaser for the items. The POS system may have information regarding an account or credit card of the purchaser, charge that account or credit card, and send a receipt for the transaction to the purchaser. In some aspects, the purchaser may present a credit card for payment or pay cash and receive a physical receipt. For example, a purchaser may carry a basket of potato chips, cheese, and an apple through a checkout lane, and a POS system may identify the potato chips, cheese, apple, and the purchaser as the purchaser walks through. In the example, the POS system charges a credit card of the purchaser for the potato chips, cheese, and apple, and then emails a receipt for the sale to the purchaser.

According to aspects of the present disclosure, a POS system may identify some of the items in a collection of items selected for purchase from one or more images of the collection, request the purchaser or a store associate to move some items, and identify the remaining items in the collection of items based on one or more images of the collection of the remaining items. In some aspects of the present disclosure, the POS system may identify the purchaser from one or more images of the purchaser and charge the purchaser for the items. The POS system may have information regarding an account or credit card of the purchaser, charge that account or credit card, and send a receipt for the transaction to the purchaser. In some aspects, the purchaser may present a credit card for payment or pay cash and receive a physical receipt. For example, a purchaser may carry a basket of potato chips, cheese, and an apple to a checkout lane. In the example, a POS system may identify the potato chips and request the purchaser to bag the potato chips. Still in the example, the POS system may identify the cheese and apple as the purchaser bags the potato chips. In the example, the POS system identifies the purchaser while the purchaser is bagging the potato chips. In the example, the POS system charges a credit card of the purchaser for the potato chips, cheese, and apple, and then emails a receipt for the sale to the purchaser.

According to aspects of the present disclosure, a POS system may identify a customer before the customer enters a checkout lane, e.g., while the customer is shopping. In some aspects of the present disclosure, the POS system may identify items selected for purchase from one or more images of the customer as the customer selects the items. In some aspects of the present disclosure, the POS system may verify that the items carried through a checkout lane by a customer match the items identified by the POS system as the customer selected the items. The POS system may have information regarding an account or credit card of the customer, charge that account or credit card, and send a receipt for the transaction to the customer after verifying the items carried through the checkout lane by the customer. In some aspects, the customer may present a credit card for payment or pay cash and receive a physical receipt. For example, a purchaser may select potato chips, cheese, an apple, and a soda while walking through a store. In the example, a POS system may identify the potato chips and request the purchaser to bag the potato chips. Still in the example, the POS system may identify the cheese, apple, and soda as the purchaser bags the potato chips. In the example, the POS system identifies the purchaser while the purchaser is bagging the potato chips. In the example, the POS system charges a credit card of the purchaser for the potato chips, cheese, apple, and soda and then emails a receipt for the sale to the purchaser.

FIG. 1 is a plan view of an exemplary store 100, according to embodiments of the present disclosure. A customer 102 may enter the store through one of the doors 104. The customer may select items for purchase from shelving units 103 and place the selected items in a cart 106 or basket. When the customer is through selecting items and ready to pay for the items, the customer can proceed to a point of sale (POS) terminal at a checkout line 120. At the POS terminal, the customer or a store associate 130 can identify (e.g., by scanning a bar-code), to the POS terminal, each of the selected items. The POS terminal determines a price for each of the items, generates a record of the transaction, and may accept payment (e.g., a credit card payment) for the transaction. The customer may also be identified (e.g., by presentation of a loyalty card) by the POS terminal, and the POS terminal may alter the transaction (e.g., by applying one or more discounts) based on the identity of the customer. When the customer has completed the transaction and is ready to leave the store, the customer exits through one of the doors 104.

Figure 2:
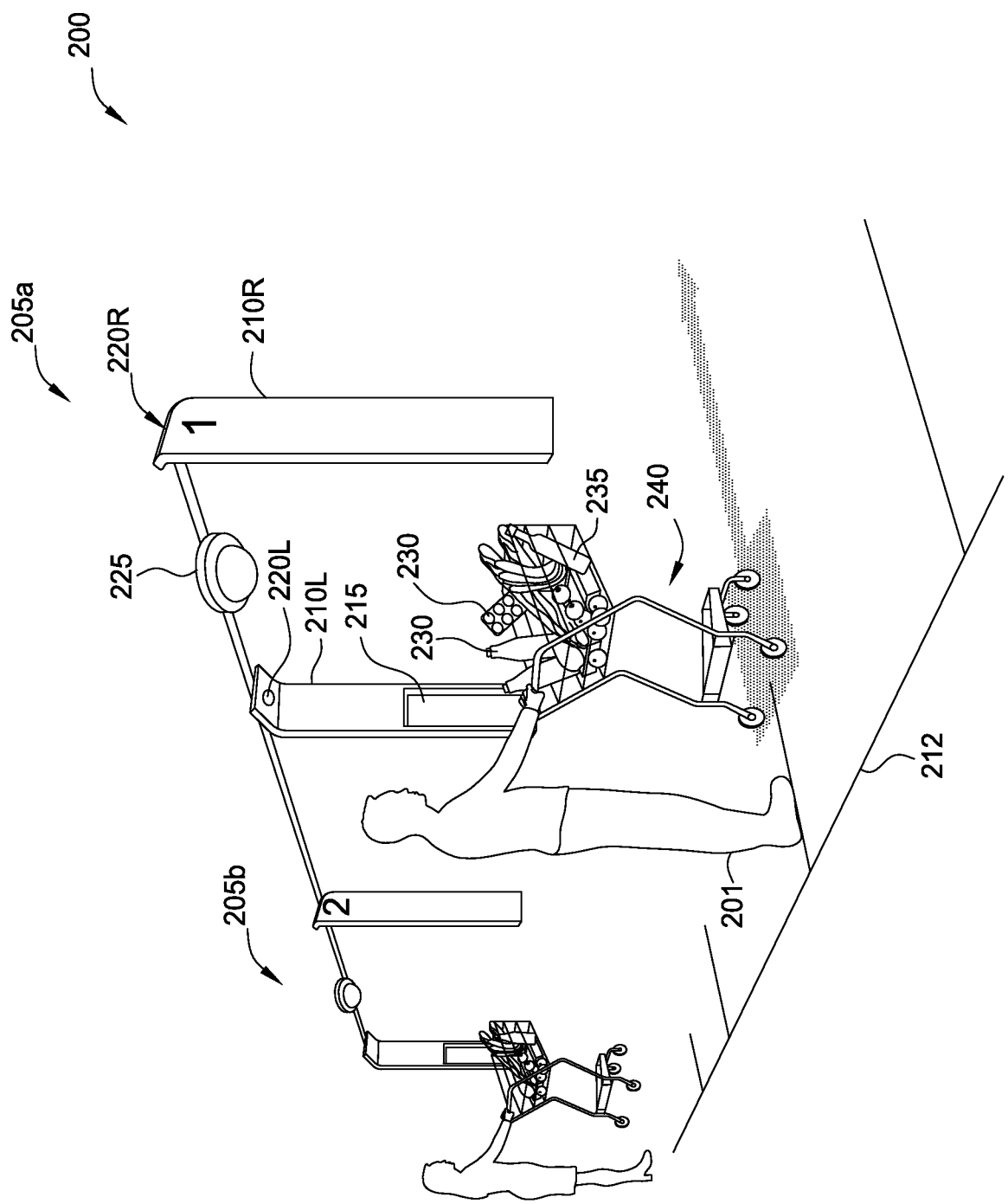
FIG. 2 illustrates an exemplary checkout area with multiple point of sale (POS) terminals, according to embodiments of the present disclosure.

FIG. 2 illustrates an exemplary checkout area 200 with multiple POS terminals, according to embodiments of the present disclosure. Checkout area 200 may be associated with or be a part of store 100 shown in FIG. 1. Checkout area 200 includes two exemplary checkout lanes 205a and 205b, but other numbers of checkout lanes are included in the scope of the disclosure. Each checkout lane may include a plurality of dividers 210L, 210R that bound each checkout lane. While the checkout lanes are shown with dividers, the dividers are optional, and checkout lanes may be bounded by markings on the floor or other means. As shown, the dividers 210L, 210R are attached to framing in the ceiling, but alternative embodiments may have one or more dividers attached to the floor or free-standing.

One or more of the dividers 210L, 210R may include input/output devices for customer interaction, such as a display 215. Other input/output devices such as audio speakers, a touchscreens, a keypads, etc. may also be included.

The dividers may include cameras 220L, 220R for capturing images of items 230 included in shopping cart 240. The cameras 220L, 220R may be oriented toward an expected position of the shopping cart 240, such as relative to a segment of lane lines 212. The images may be analyzed based on properties of the items 230, as well as labeling such as barcodes 235. A separate camera 225 may be included for capturing additional images of the items 230 and/or images of the customer 201.

Images of the customer may be used to identify the customer. Identifying the customer may allow association of the transaction with an associated stored profile of the customer. Associating the transaction with a stored profile may allow the POS system to track a customer's shopping habits. A profile of a customer may be created by the POS system when the customer first interacts (e.g., applies for a loyalty card or completes a purchase) with the POS system. The profile may include information associated with the customer, such as an address, a phone number, a credit card account, and records of previous purchases by the customer. The records of previous purchases by the customer may be analyzed by the POS system to determine patterns and/or shopping habits of the customer. For example, a POS system may determine that customer Bob Jones buys only 1% fat milk and no other types of milk. In a second example, a POS system may determine that customer Sharon Smith buys a can of spaghetti sauce whenever she buys a package of spaghetti, and she buys a container of Alfredo sauce whenever she buys a package of fettuccine. A customer's shopping habits may be used by the POS system or the retailer in making suggestions to the customer and managing inventory for the store. For example, if a store is running a discount promotion on brand X Alfredo sauce, a POS system in the store may cause a speaker near Sharon Smith to play a message about the discount on brand X Alfredo sauce when the POS system determines (e.g., by means of a camera near a shopping aisle) Sharon Smith has selected a package of fettuccine.

Identifying the customer may also be used by a POS system in completing a transaction, for example, the purchase of goods by a customer may be authenticated based on the POS system recognizing the customer. That is, a POS system may be authorized by a customer to charge a credit card for a purchase when the POS system recognizes the customer, or, in a two-factor authentication system, recognizing the face of the customer may be one of the two factors.

According to aspects of the present disclosure and as mentioned above, a POS system may identify all of the items in a collection of items selected for purchase from one or more images of the collection. Cameras associated with each checkout lane 205 may be used by a POS system to identify all of the items in a collection of items (e.g., all of the items in a shopping cart).

Figure 3:
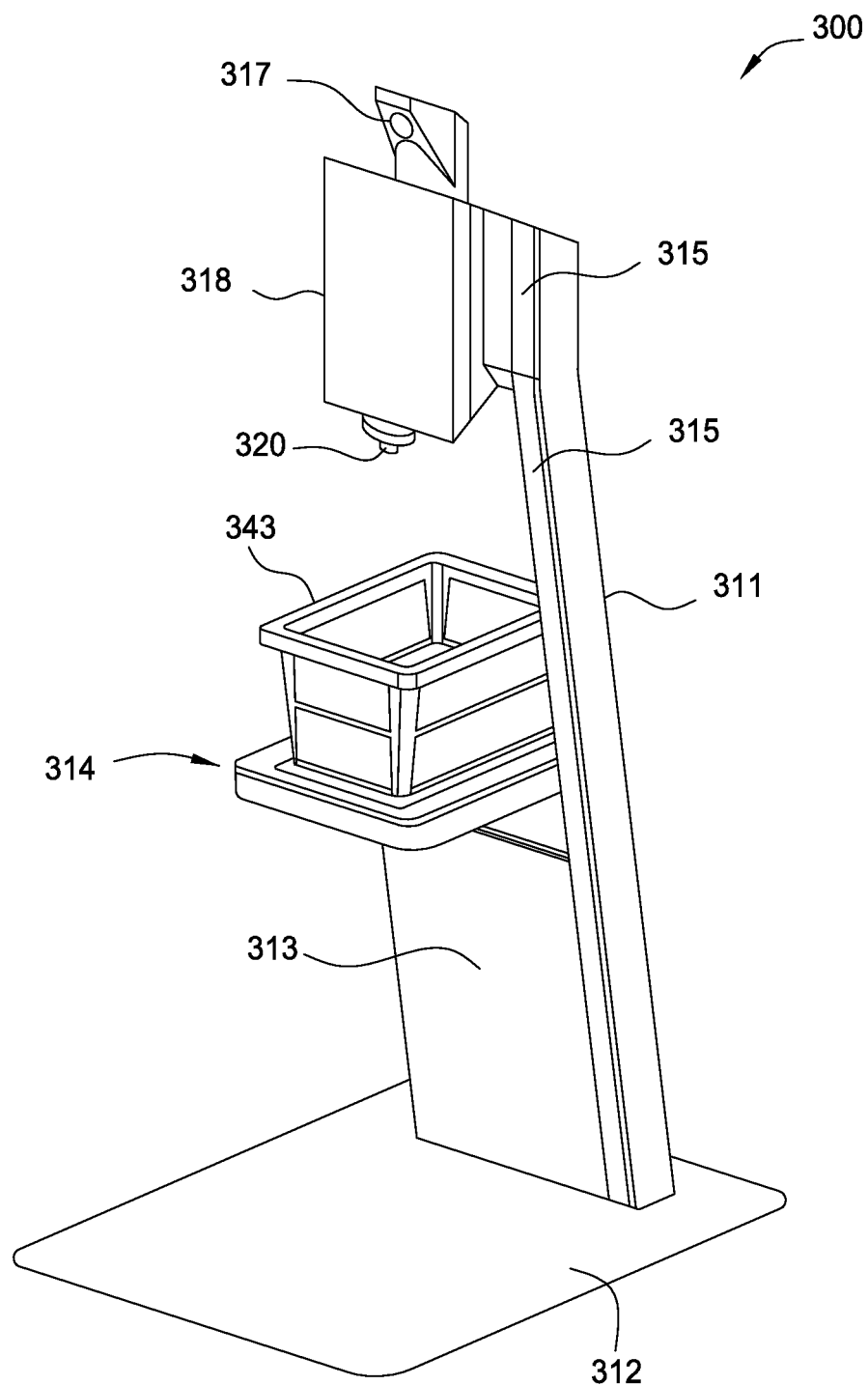
FIG. 3 illustrates an exemplary POS terminal, according to embodiments of the present disclosure.

FIG. 3 illustrates an exemplary POS terminal 300 (e.g., a kiosk), according to embodiments of the present disclosure. POS terminal 300 may be associated with or be a part of store 100 shown in FIG. 1. Generally, POS terminal 300 allows customers to purchase items or perform other shopping-related tasks. POS terminal 300 includes a base portion 312, one or more vertical portions 311, 313, and a support member 314 for supporting a shopping basket 343. POS terminal 300 includes a camera 320 oriented for identifying store items in a shopping basket 343. POS terminal 300 may include a display 318 and camera 317 that are generally oriented toward customers using the POS terminal. Vertical portion 311 may also include a plurality of indicator lights 315.

In some embodiments of the present disclosure, the camera 320 may be oriented such that it can view both items in the shopping basket 343 and a customer using the POS terminal 300. The camera 320 may be oriented to view items in the shopping basket 343 and a customer using the POS terminal 300 by placing the camera 320 high on the POS terminal 300, using a motor to move the camera 320 to change the viewpoint of the camera 320, or supplying the camera 320 with a wide-angle lens.

The support member 314 may have markings indicating where the basket 343 should be positioned during operation of the POS terminal 300. Similarly, the display 318 may present messages to assist a customer in positioning the basket 343. Indicator lights 315 may also be used to indicate proper or improper basket positioning on support member 314. The support member 314 may also include a scale for determining the weight of the basket 343. The weight of the basket may be used in identifying items within the basket 343.

According to aspects of the present disclosure and as mentioned above, a POS system may identify some of the items in a collection of items selected for purchase from one or more images of the collection, request the purchaser or a store associate to move some items, and identify the remaining items in the collection of items based on one or more images of the collection of the remaining items. Cameras 320 and 317 associated with POS terminal 300 may be used by a POS system to identify items in the basket 343. The display 318 and indicator lights 315 may be used by the POS system to notify a customer or store associate to move some items (e.g., to bag the items) in the basket 343. For example, the POS system may determine that there are items that cannot be scanned beneath a loaf of bread in the basket 343. In the example, the POS system causes the indicator light 315 to glow red to indicate that some items were not scanned. Still in the example, the POS system causes the display screen 318 to display a video image of the basket with a green highlight effect surrounding the loaf of bread and text saying, "Please remove this item so that other items in the basket may be scanned." Moving identified items may allow the cameras 320 and 317 another view of items remaining in the basket, possibly enabling the POS system to identify the remaining items.

Figure 4:
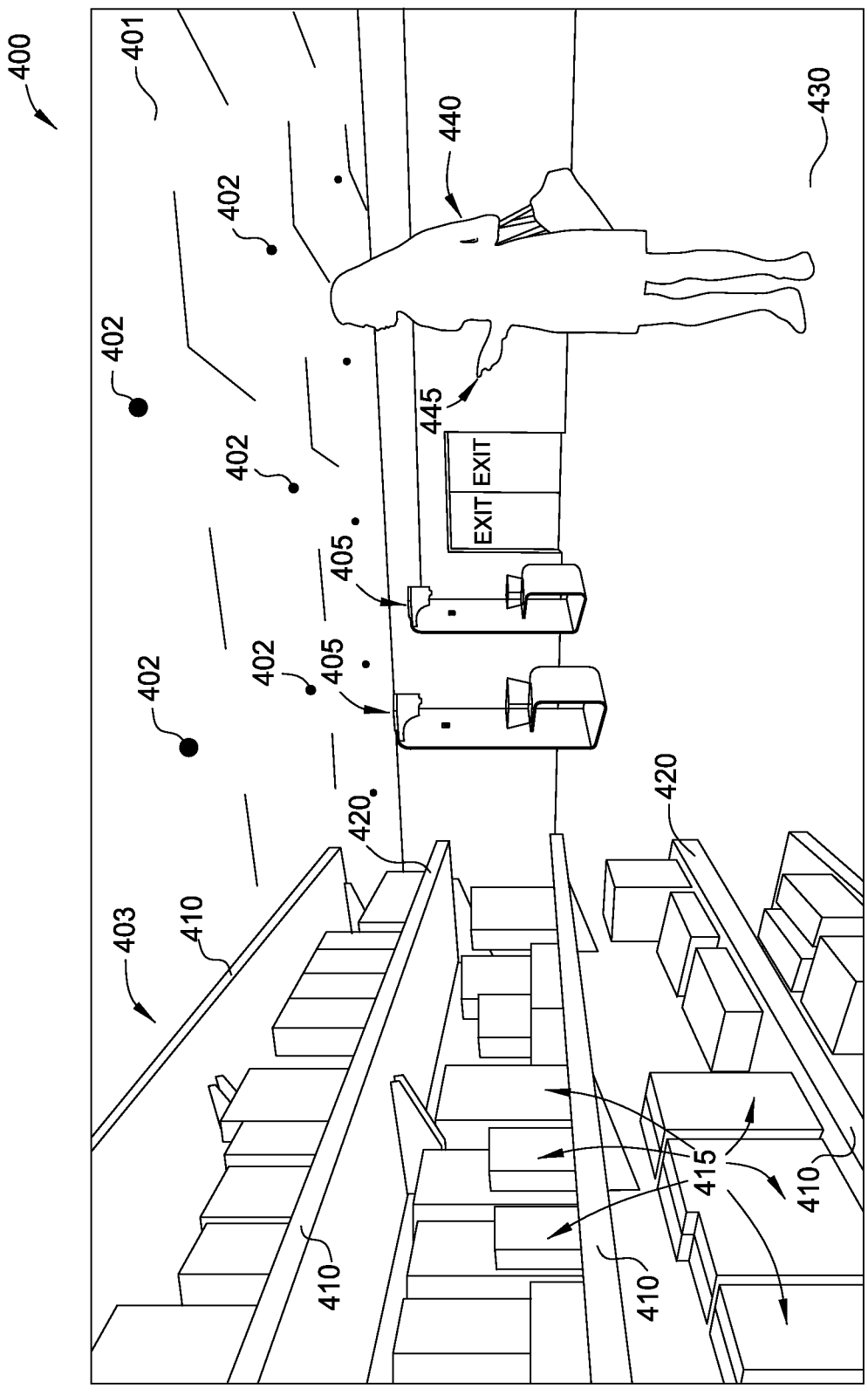
FIG. 4 illustrates a portion of an exemplary store depicting shelves, POS terminals and an exit to the store, according to embodiments of the present disclosure.

FIG. 4 illustrates a portion of an exemplary store 400 depicting shelves, POS terminals and an exit to the store, according to embodiments of the present disclosure. The store 400 may include a plurality of sensor modules 402 disposed in the ceiling 401. Each sensor module 402 may include one or more types of sensors, such as visual sensors (e.g., cameras), audio sensors (e.g., microphones), and motion sensors. Sensor modules 402 may also include actuating devices (e.g., motors) for orienting (e.g., moving and/or aiming) the sensors. Sensor modules or individual sensors may generally be disposed at any suitable location within the store 400. Some non-limiting examples of alternative locations include below, within, or above the floor 430, and within other structural components of the store 400 such as a shelving unit 403 or walls. In some embodiments, sensors may be disposed on, within, or near product display areas such as shelving unit 403. The sensors may also be oriented toward an expected location of a customer's interaction with items, to provide data about the interaction, such as determining a customer's actions.

A customer 440 entering the store 400 may be recognized by a POS system. The POS system may recognize the customer based on, for example, an identification card, a loyalty program card, an app running on a mobile device 445 of the customer 440, or the POS system recognizing the customer's face (e.g., from an image captured by a visual sensor 402). When the customer 440 enters the store 400, the customer 440 may indicate that they wish to be tracked by the POS system. The customer 440 may indicate they wish to be tracked by, for example, by walking through a lane marked on the floor, selecting a particular type of cart, or activating an app on a mobile device 445.

The POS system of the store 400 may use sensor modules 402 to track the customer 440 and/or the cart used by the customer. The POS system of the store 400 may track the customer 440 by, for example, using facial recognition on images from the sensor modules 402, locating a radio-frequency identifier (RFID) chip (e.g., on a loyalty program card or a cart used by the customer), or locating a mobile device 445 of the customer.

Store 400 also includes a number of POS terminals (or terminals) 405. POS terminals 405 may be similar to POS terminal 300. Generally, POS terminals 405 allow customers to purchase items or perform other shopping-related tasks. In some aspects of the present disclosure, a customer 440 may have a mobile computing device, such as a smartphone 445, that communicates with the POS terminal 405 to complete a purchase transaction. In aspects of the present disclosure, the mobile computing device may execute a store application (i.e., an app) connected to networked computing systems through wireless networks accessible within the store (e.g., over Wi-Fi or Bluetooth). In one embodiment, the mobile computing device may communicate with the POS terminal 405 when brought within range, e.g., using Bluetooth or near-field communication (NFC) tags.

Store 400 also includes shelving units 403 with shelves 410 and items 415 that are available for selection, purchase, etc. Multiple shelving units 403 may be disposed in a particular arrangement in the store 400 to form aisles through which customers may navigate. In some embodiments, the shelving unit 403 may include attached and/or embedded visual sensors or other sensor devices or I/O devices. The sensors or devices may communicate with a customer's smartphone 445 or other networked computing devices within the store 400. For example, the front portions 420 of shelves 410 may include video sensors oriented outward from the shelving unit 403 to capture customer interactions with items 415 on the shelving unit 405, and the data from the video sensors may be provided to back-end servers for storage and/or analysis.

When the POS system of the store 400 is tracking a customer 440, the POS system may use one or more sensors 402 to determine that the customer 440 has selected an item 415 for purchase. Sensors located on shelves 410, in the ceiling 401, and in the floor 430 may be used by the POS system to determine the customer 440 has selected an item 415 for purchase. The POS system may observe the customer picking up an item 415, placing an item 415 in a basket, or placing an item 415 on the customer's person (e.g., in a pocket). A basket associated with the customer 440 may detect that the customer has placed an item 415 in the basket and send a signal (e.g., via a wireless network) to the POS system.

The sensors 402 may also be used by the POS system to identify an item 415 selected by a customer 440. For example, the POS system may use images captured by sensors 402 to determine a color, size, and location (e.g., aisle and shelf position) of the item 415, and the POS system may identify the item based on those attributes. Additionally or alternatively, a basket associated with the customer 440 may identify the item 415, for example, by scanning an RFID chip or bar-code of the item. The basket may signal the identity of the item to the POS system. The customer 440 also may identify the item 415 to the POS system, for example, by taking an image of the item 415 with a mobile device 445 of the customer 440 and sending the image to the POS system.

According to aspects of the present disclosure and as mentioned above, a POS system may identify a customer before the customer enters a checkout lane, e.g., while the customer is shopping. In some aspects of the present disclosure, the POS system may identify items selected for purchase from one or more images captured as the customer selects the items. In some aspects of the present disclosure, the POS system may verify that the items carried through a checkout lane by a customer match the items identified by the POS system as the customer selected the items. The POS system may, upon verifying all of the items, complete a transaction with the customer (e.g., charge the customer for purchased items) and produce (e.g., by printing or emailing) a receipt for the customer.

Figure 5:
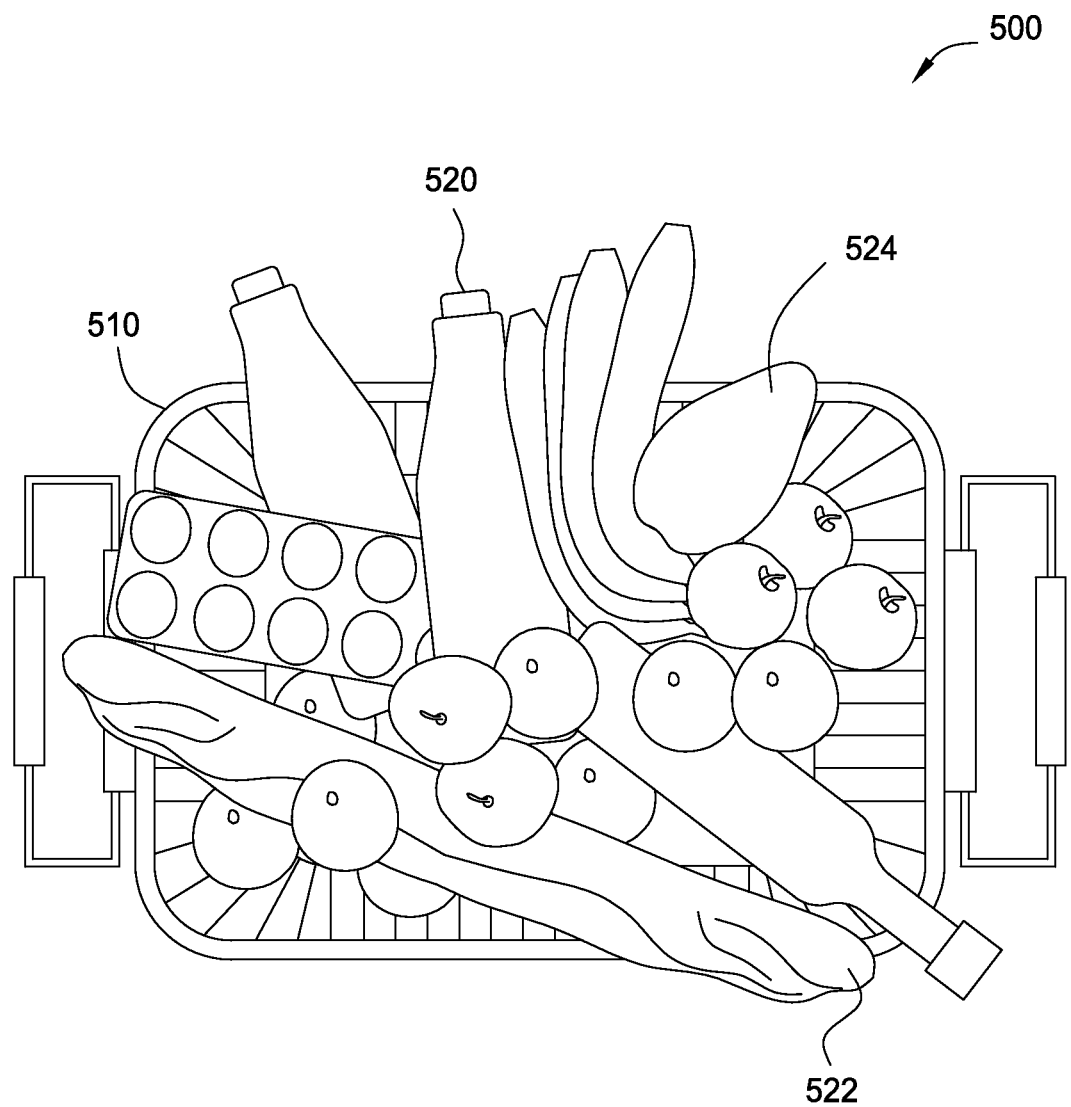
FIG. 5 illustrates an exemplary collection of items, according to aspects of the present disclosure.

FIG. 5 illustrates an exemplary collection 500 of items (e.g., goods) that may be purchased by a shopper. The items may be in a container 510 that may be similar to basket 443, shown in FIG. 4, or shopping cart 540, shown in FIG. 5. Items 520, 522, and 524 may be arranged in container 510 in a wide variety of manners. In some arrangements, one or more items may obstruct a view of another item from at least one direction. When a customer is checking out at a POS terminal (e.g., POS terminal 400 shown in FIG. 4) or checkout lane (e.g., checkout lane 205 shown in FIG. 2), obstruction of the view of an item may prevent a POS system from identifying the item with 100% confidence, and therefore the POS system may be prevented from adding the item to a transaction for the customer. If the POS system is prevented from adding the item to the transaction, then the customer or shopping attendant may be required to identify the unidentified item (e.g., by scanning a barcode of the unidentified item), slowing the checkout process.

According to aspects of the present disclosure, a POS system may determine (e.g., by using an algorithm and/or querying a database of identifications) possible identifications of a scanned unidentified item and select one of the identifications for inclusion in an order (e.g., a transaction) based on one or more recognition techniques. The number of items considered as possibilities for the unidentified item may be reduced (e.g., from the set of all products carried by the store) based on determination of a partial barcode, partial quick response (QR) code, reflected light, color, size, weight range, packaging dimensions, packaging shape, packaging design geometrical design data, graphics design data, or other characteristics of the unidentified item. The number of items considered as possibilities may also be reduced based on where the shopper has been in the store during this particular visit, where the shopper is in the store when the unidentified item is scanned (e.g., in a shop with multiple POS terminal locations, or for mobile shopping), purchase history of this shopper, other items in the group of items being purchased or scanned, coupons presented by the shopper, and promotions being run by the store.

Figure 6:
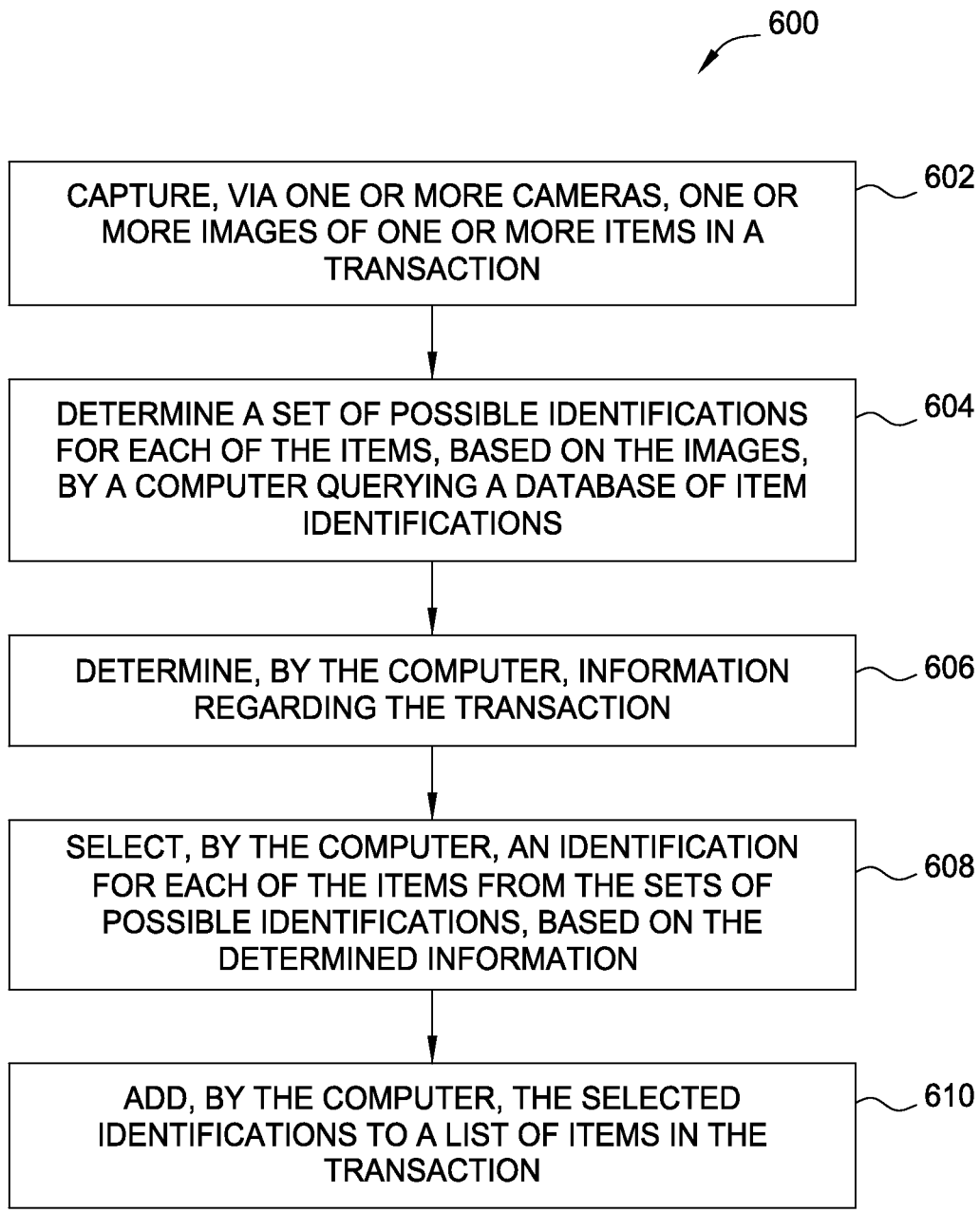
FIG. 6 illustrates an exemplary operation for identifying items in a transaction, according to aspects of the present disclosure.

FIG. 6 illustrates an exemplary operation 600 for identifying items in a transaction, according to aspects of the present disclosure. Operation 600 may be performed by a POS system, for example POS system 800, shown in FIG. 8.

Operation 600 begins at block 602, wherein a system captures, via one or more cameras, one or more images of one or more items in a transaction. For example, POS system 800 may use camera 320 on POS terminal 300 to capture an image of an unidentified item 520.

At block 604, the system determines a set of possible identifications for each of the items, based on the images, by a computer querying a database of item identifications. For example, POS system 800 may look up a partial bar-code for an item 520 in a database of items carried by the store 100, and determine that all of the items carried by the store 100 having bar-codes that match the partial bar-code are bottles of milk with prices ranging from $1.29 to $1.59.

Operation 600 continues at block 606, wherein the system determines, by the computer, information regarding the transaction. For example, POS system 800 may use camera 317 to capture an image of the customer 440, identify the customer 440 from the image, look up the shopper's profile in a database, and determine the customer 440 has set a threshold amount of a maximum error of $0.50 in prices of unidentified items. In the example, the customer 440 may have set a preference for errors of up to $0.50, in order to allow for quicker check-out.

At block 608, the system selects, by the computer, an identification for each of the items from the sets of possible identifications, based on the determined information. For example, POS system 800 may select a bottle of milk having a price of $1.59 from a set of identifications for item 520 ranging in price from $1.29 to $1.59, based on a customer preference allowing errors of up to $0.50 in prices of unidentified items.

At block 610, the system adds, by the computer, the selected identifications to a list of items in the transaction. Continuing the above example, POS system 800 adds the selected identification of a bottle of milk costing $1.59 to the transaction.

According to aspects of the present disclosure, a POS system may resolve (e.g., determine an identification for) a non-read (i.e., a failure to identify) of an item by applying different weighting factors for attributes of the item, such as color, weight, cost, etc. in a determination algorithm.

According to aspects of the present disclosure, weighted factors for attributes of an item may be used at different times in the determination algorithm. The determination algorithm may be a cascading, hierarchical algorithm.

According to aspects of the present disclosure, possible identifications of an unidentified item could be displayed to a shopper to facilitate item selection (e.g., by pressing a button on screen) from a set of choices or to a store associate to facilitate remote help (e.g., through a tablet, POS terminal, mobile device, or from a call center). A POS system may also request (e.g., by playing an audio message via a speaker or displaying a text message on a display screen) the shopper or a store associate to select an identification for an item.

According to aspects of the present disclosure, a customer may be asked to intervene to show more (e.g., allowing a new view of the item to a camera) of an unidentified item. In these situations, the POS system may start at the beginning of the determination algorithm with a new image of the unidentified item. If the POS system is unable to identify the identified item, then a store employee may identify the item from the pictures.

According to aspects of the present disclosure, a customer may be asked to intervene by manually entering a description of the item. For example, a customer may be prompted to type in a description on a touchscreen, and the customer may type "it is peas!"

According to aspects of the present disclosure, an item that is not fully recognized may be added to a transaction based upon a calculated confidence factor for the item exceeding a threshold confidence level. For example, the size, color, partial barcode, and weight range of an unidentified item may suggest a particular item with 99% confidence, and the POS system may add the item to a transaction based on the 99% confidence level exceeding a threshold level of 95%. Retailers may determine a threshold confidence level to have items recognized and added to transactions.

According to aspects of the present disclosure, a POS system may indicate identified items (e.g., by projecting an indicator on the items or showing the items on a display screen) in a group of items for removal by a customer or shopping assistant, and after an identified item is removed from the group, the POS system scans and attempts to identify the unidentified items again. For example, a basket containing twenty items may be placed within an object recognition area of a POS terminal by a customer. In the example, during a first scan, only eight of the twenty items are recognized, and four other items are partially recognized. Still in the example, the POS system indicates the eight items that have been identified and can be removed by shining a light on them. In the example, the shopper removes the eight identified items, and the POS system repeats the process of item identification on the remaining twelve items using the described techniques.

According to aspects of the present disclosure, a POS system may consider prices of possible identifications in selecting an identification for an unidentified item. A POS system may determine the prices of all possible identifications are within a threshold amount of each other and select an identification to add to a transaction without stopping the checkout process to better identify the item. For example, a POS system may detect an unidentified item while a customer is checking out. In the example, the system determines a 95% match on a can of peeled tomatoes and an 85% match on a can of crushed tomatoes for the unidentified item. Still in the example, the system determines that the can of peeled tomatoes and the can of crushed tomatoes have the same price of 89 cents. In the example, the system will then add peeled tomatoes because the peeled tomatoes are above a 90% match and both the peeled tomatoes and crushed tomatoes are the same price and under $1.

In many cases, if the multiple possible identifications for an unidentified item are the same price, the final price charged will not need to be modified and the shopper will not have to be charged or credited to correct the system's best guess logic.

If desired (e.g., based on store management or shopper preference), once an order is complete, a verification of the order may be done by a store associate. Verification of the order may improve inventory correction and item tracking performed at the store.

According to aspects of the present disclosure, a POS system may consider other items being purchased when selecting an identification for an unidentified item. For example, a POS system may determine, based on a partial view of an item, that the item is either tomato sauce or tomato soup. In the example, the POS system also determines that a box of pasta is in the order, and the system then determines to select tomato sauce as the identification of the item, based on it being more likely for the shopper to buy tomato sauce with pasta than tomato soup.

According to aspects of the present disclosure, a POS system may consider previous shopper history when selecting an identification for an unidentified item. A shopper's history may be determined from a profile of that shopper stored in the system. For example, a POS system may determine, based on a partial view of an item, that the item is a gallon of either 2% milk or 1% milk. In the example, the POS system determines from a profile of a shopper that the shopper always gets 2% milk instead of 1% milk, and the system then selects a gallon of 2% milk as the identification of the item, based on the history of that shopper.

According to aspects of the present disclosure, a POS system may consider coupons (e.g., coupons presented by the shopper) or promotions (e.g., promotions announced by the store), which would require a specific combination of items in the order, when selecting an identification for an unidentified item. For example, if a store is running a promotion wherein bread is two loaves for the price of one, and one loaf of bread was positively identified and another loaf of bread in a cart could be one of two options (i.e., the system has determined two possible identifications for the loaf of bread), but only one option (i.e. identification) will trigger the promotion, the system could select the option triggering the promotion. Similarly, if a coupon is presented, the system could ensure that an item added to the order allows the coupon to be used.

According to aspects of the present disclosure, a POS system may consider prices of the possible identifications of items in question. In these aspects, there may be a price threshold at which the POS system chooses to add a lower priced item to an order when there is a chance for the lower priced item to be in the cart. For example, a POS system may use a predetermined threshold of twenty cents in determining identifications of items and determine that bananas are in a cart, but be unable to determine with 100% certainty whether the bananas are organic bananas or regular bananas. In the example, if the price difference between organic bananas and regular bananas is less than the threshold, for example, ten cents, then the system may choose to add the lower priced bananas (e.g., the regular bananas) to the order. In a second example, a POS system uses a price threshold of $1 in determining items to add to an order and determines an unidentified item in an order could be a can of soda for which possible identifications have costs ranging from $0.50 to $3. In the example, the system determines not to add (e.g., guess) an uncertain identification for the item due to the $2.50 price difference being higher than the $1 threshold.

In aspects of the present disclosure, the POS system may determine a threshold to use in determining whether to add an item to an order when an unidentified item has more than one potential identification. The price threshold may be based on the item price (e.g., if all of the possible matches are less than twenty cents, add the lowest priced identification) or the price differences between the possible matches (e.g., if the largest difference between the possible identifications is less than twenty cents, add the lowest priced identification). The price threshold may also be based on relative differences between the possible matches (e.g., if the largest difference between possible identifications is less than two percent of the lowest priced identification, add the lowest priced identification). A POS system may determine a first candidate price threshold based on candidate prices of an unidentified item (e.g., prices of potential identifications of the item), a second candidate price threshold based on differences between candidate prices of the unidentified item, and a third candidate price threshold based on relative differences between candidate prices of the unidentified item, and then select one of the candidate price thresholds to use in determining whether to add an identification for the item to an order.

In aspects of the present disclosure, the POS system may determine a threshold to use in determining whether to add a lower priced item to an order when an unidentified item has more than one potential identification based on an overall price of the order (e.g., a price total for all other items, a subtotal for all items identified so far, or an estimated price total).

In aspects of the present disclosure, the POS system may determine a threshold to use in determining whether to add a lower priced item to an order when an unidentified item has more than one potential identification based on a shopper's preference (e.g., based on a setting in a stored profile of the shopper, a question asked when the shopper begins checking out, or a question asked when the shopper entered the store).

According to aspects of the present disclosure, a POS system may use information about items on shelves of a store to in identifying items in a customer's order. For example, a POS system may identify an item as a can of peas (e.g., based on shape, size, and color), but the POS system may not be able to identify if the can of peas are low sodium or regular. In the example, the POS system may determine (e.g., with a camera in the ceiling of the store) that the count of cans of low sodium peas is reduced by one from an earlier count, and the POS may identify the can of peas as a can of low sodium peas, based on the count of cans on the shelf.

Figure 7:
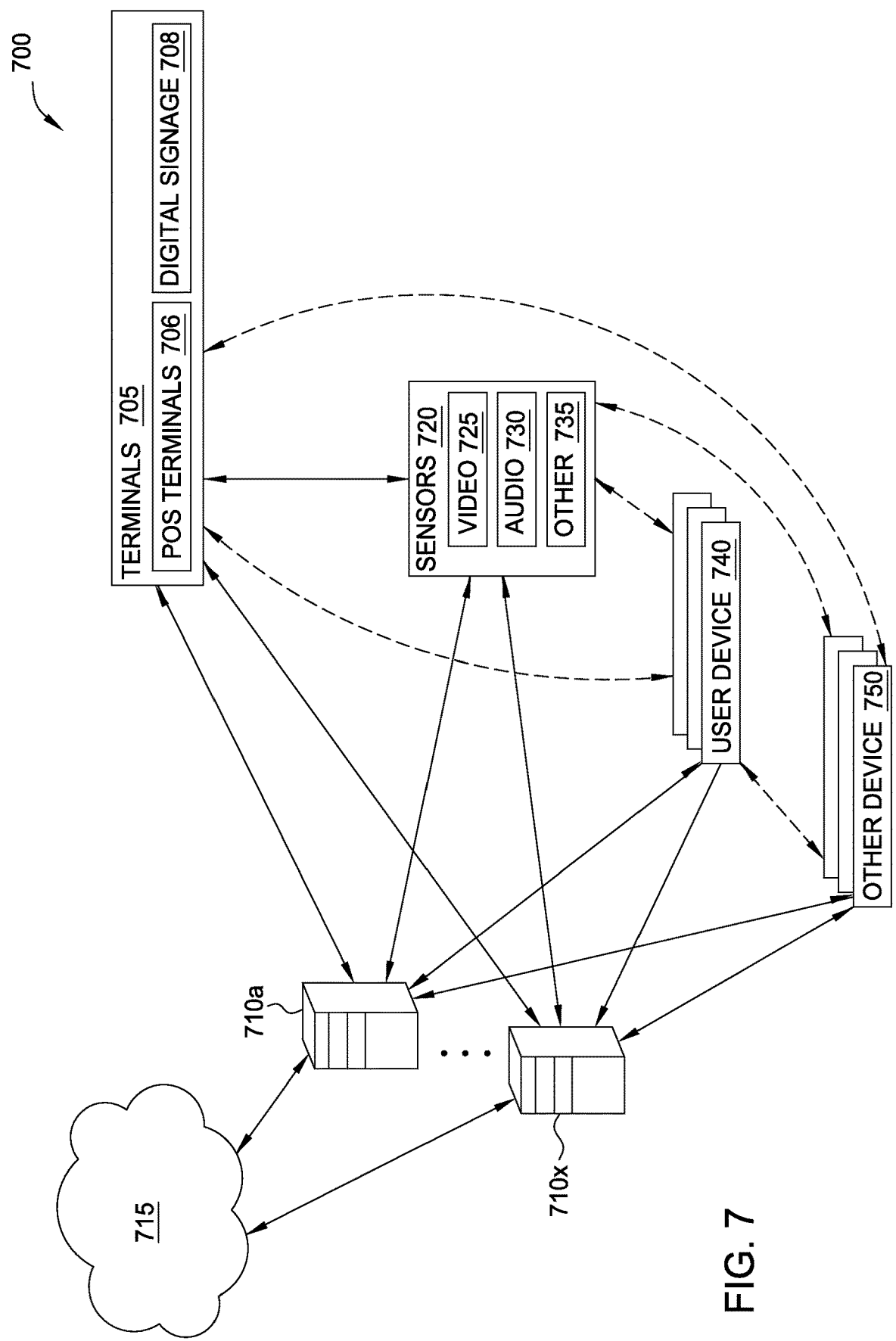
FIG. 7 illustrates exemplary equipment used in an embodiment of a POS system, according to aspects of the present disclosure.

FIG. 7 illustrates exemplary equipment used in an embodiment of a POS system in a store 700, according to one embodiment. Store 700 may be similar to store 100. As shown, store 700 includes a plurality of terminals 705, a plurality of servers 710a through 710x coupled with a network 715, one or more sensors 720, one or more user devices 740, and one or more other devices 750.

Terminals 705 generally include touch-screens, keyboards, mice, video displays, and speakers capable of receiving input from customers and/or producing output to customers within the store 700. Terminals 705 may be used for determining information used by a POS system in performing the functions disclosed herein. The terminals 705 may include computing systems, portions of computing systems, or devices controllable by computing systems, including the POS terminals 205 shown in FIG. 2. In one example, a terminal may include a computing device, a video display, audio speaker(s), a mouse, and a keyboard. In another example, a terminal may include a video display and associated driver hardware, but a computing device coupled to the terminal and providing data for display is disposed separately from the terminal. In some embodiments, terminals 705 may be implemented as standalone devices, such as a POS terminal (e.g., POS terminals 205 shown in FIG. 2) on the store floor or a device on a shelf or platform. In some embodiments, terminals 705 may be integrated partially or wholly with other components of the store 700, such as shelving. In some embodiments, terminals 705 may be modular and easily attached to and detached from elements of the store 700.

Servers 710a through 710x generally include processors, memory, and communications capabilities, and may perform operations described herein. Servers 710a through 710x communicate using various wired and/or wireless communications methods with terminals 705, sensors 720, and with other networked devices such as user devices 740 and other devices 750. Servers 710a through 710x generally execute computer program code in which input data is received from networked devices, the input data is processed and/or stored by the servers, and output data is provided to networked devices for operation of the store 700.

Sensors 720 may include video sensors 725, audio sensors 730, and other sensors 735. The other sensors 735 generally include any sensor capable of providing meaningful information about customer interactions with the environment, e.g., location sensors, weight sensors, and motion sensors. Sensors 720 may be deployed throughout the store 700 in fixed (e.g., locations 402 and POS terminals 405 shown in FIG. 4) and/or movable locations.

Figure 8:
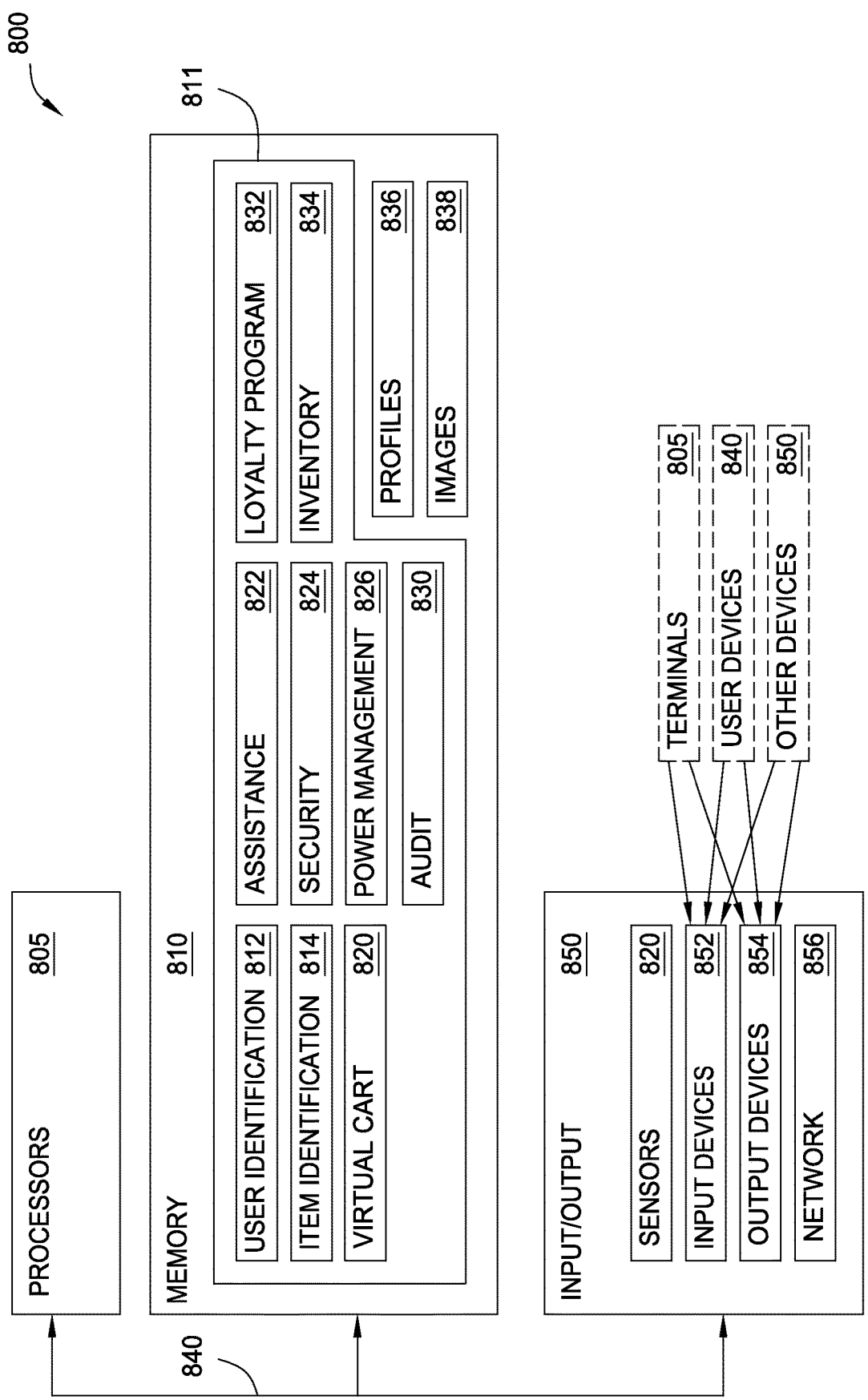
FIG. 8 is a schematic of an exemplary POS system, according to aspects of the present disclosure.

FIG. 8 is a schematic of an exemplary POS system 800, according to aspects of the present disclosure. POS system 800 may perform the operations described herein. Generally, the system 800 corresponds to the store 700 described above. System 800 includes one or more processors 805, memory 810, and input/output modules 850, which are interconnected using one or more connections 840. In one embodiment, system 800 may be included in a single computing device, and the connection 840 may be a common bus. In other embodiments, system 800 is distributed and includes a plurality of discrete computing devices that are connected through wired or wireless network techniques. Processors 805 may be included in a single computing device, or may represent processing elements aggregated across a number of networked devices, such as user device 445 and 740 (see FIGS. 4 and 7), POS terminals 405 (see FIG. 4), etc.

Memory 810 may include cache, random access memory (RAM), storage, etc. Storage included as part of memory 810 may typically provide a non-volatile memory for the networked computing devices (e.g., servers 710a through 710x shown in FIG. 7), and may include one or more different storage elements such as Flash memory, hard disk drives, solid state drives, optical storage devices, and/or magnetic storage devices. Memory 810 may be included in a single computing device or may represent an aggregation of memory included in networked devices. Memory 810 may include a plurality of modules 811 for performing various functions described herein. The modules 811 store program code that is executable by one or more of the processors 805. As shown, modules 811 include user identification module 812, item identification module 814, virtual cart module 820, assistance module 822, security module 824, power management module 826, audit module 830, loyalty program module 832, and inventory module 834. The modules 811 may also interact to perform disclosed functions. For example, virtual cart module 820 may interact with user identification module 812 (e.g., to perform user identification) and loyalty program module 832 to determine a customer's purchase history and identify items being purchased by the customer. The modules provided here are not intended to be an exhaustive list, and different functions may be assigned to different modules. Memory 810 may also include customer profiles 836 and customer images 838, which may be accessed and modified by the modules 811. Virtual card module 820 may access customer profiles 836 in identifying items being purchased. The customer profiles 836 and customer images 838 may be stored within one or more databases on the servers 710a through 710x or on a database separate from the store 700.

Input/output (I/O) functions for the POS system 800 may be provided by an I/O subsystem 850 that may include a number of different devices that are capable of interfacing with computing devices and/or with the greater store. I/O subsystem 850 may provide information used by POS system 800 in identifying items being purchased. I/O subsystem 850 includes sensors 720, described above. I/O subsystem 850 may further include wired or wireless connections to an external network 856 using I/O adapter circuitry. Network 856 may include a local area network (LAN), a general wide area network (WAN), and/or a public network (e.g., the Internet). In one embodiment, various networked computing devices of the system 800 are interconnected using a LAN, and one or more computing devices (e.g., servers 710a through 710x and user devices 740) include connections to the Internet.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for identifying one or more items in a transaction performed by a point of sale (POS) system, the method comprising:
    capturing, via one or more cameras directed by the POS system, one or more images of one or more items in the transaction;
    querying, using a computer of the POS system, a database of item identifications based on the one or more images, wherein a set of possible identifications is identified for a first item of the one or more items;
    selecting, upon determining that price information associated with the set of possible identifications satisfies a price error threshold, an identification from the set of possible identifications to identify the first item, wherein the price information satisfies the price error threshold if a difference between a maximum price and a minimum price of prices of the set of possible identifications is less than or equal to the price error threshold; and
    adding, by the computer, the selected identification to a list of items in the transaction stored in a computer-readable memory.

2. The method of claim 1, further comprising:
    determining one or more characteristics of a purchaser of the transaction.

3. The method of claim 1, further comprising:
    determining one or more attributes of an item, based on the one or more images, and wherein selecting an identification for the item is further based on applying weighting factors, by the computer, to the attributes of the item.

4. The method of claim 1, wherein selecting an identification is further based on requesting, via at least one of a display and a speaker, a person to select, via the display, the identification from a set of choices.

5. The method of claim 1, further comprising:
    determining, by the computer, an identification of an item in the transaction.

6. The method of claim 1, further comprising:
    determining, via one or more other cameras, information regarding items on shelves of a shelving unit, wherein selecting an identification for an item is further based on the information regarding items on the shelves.

7. A computer program product for identifying one or more items in a transaction, the computer program product comprising:
    a computer-readable storage medium having computer-readable program code embodied therewith, the computer-readable program code executable by one or more computer processors, of a point of sale (POS) system, to perform an operation that includes:
        capturing, via one or more cameras directed by the POS system, one or more images of one or more items in the transaction;
        querying, using a computer of the POS system, a database of item identifications based on the one or more images, wherein a set of possible identifications is identified for a first item of the one or more items;
        selecting, upon determining that price information associated with the set of possible identifications satisfies a price error threshold, an identification from the set of possible identifications to identify the first item, wherein the price information satisfies the price error threshold if a difference between a maximum price and a minimum price of prices of the set of possible identifications is less than or equal to the price error threshold; and
        adding, by the computer, the selected identification to a list of items in the transaction stored in a computer-readable memory.

8. The computer program product of claim 7, further comprising:
    determining one or more characteristics of a purchaser of the transaction.

9. The computer program product of claim 7, wherein the operation further comprises:
    determining one or more attributes of each item, based on the one or more images, and wherein selecting an identification is further based on applying weighting factors to attributes of an item.

10. The computer program product of claim 7, wherein selecting an identification is further based on requesting, via at least one of a display and a speaker, a person to select, via the display, the identification from a set of choices.

11. The computer program product of claim 7, further comprising:
    determining, by the computer, an identification of an item in the transaction.

12. The computer program product of claim 7, wherein the operation further comprises:
    determining, via one or more other cameras, information regarding items on shelves of a shelving unit, wherein selecting an identification for an item is further based on the information regarding items on the shelves.

13. A point of sale (POS) system for identifying one or more items in a transaction, comprising:

one or more computer processors;

one or more visual sensors communicatively coupled with the one or more computer processors; and a memory containing program code which, when executed by the one or more computer processors, causes the POS system to perform an operation comprising:

capturing, via one or more cameras directed by the POS system, one or more images of one or more items in the transaction;

querying, using a computer of the POS system, a database of item identifications based on the one or more images, wherein a set of possible identifications is identified for a first item of the one or more items;

selecting, upon determining that price information associated with the set of possible identifications satisfies a price error threshold, an identification from the set of possible identifications to identify the first item, wherein determining that price information associated with the set of possible identifications satisfies a price error threshold comprises determining that a difference between a maximum price and a minimum price of prices of the set of possible identifications is less than or equal to the price error threshold; and adding, by the computer, the selected identification to a list of items in the transaction stored in a computer-readable memory.

14. The POS system of claim 13, further comprising:

determining one or more characteristics of a purchaser of the transaction.

15. The POS system of claim 13, wherein the operation further comprises:

determining one or more attributes of each item, based on the one or more images, and wherein selecting an identification is further based on applying weighting factors to attributes of an item.

16. The POS system of claim 13, further comprising:

a speaker; and a video display, wherein the operation further comprises presenting a set of choices on the video display and selecting an identification is further based on requesting, via at least one of the speaker and the video display, a person to select the identification from a set of choices presented on the video display.

17. The POS system of claim 13, further comprising:

determining, by the computer, an identification of an item in the transaction.

\* \* \* \* \*